United States Patent [19]
Choi

[11] Patent Number: 5,964,873
[45] Date of Patent: Oct. 12, 1999

[54] METHOD FOR UPDATING A ROM BIOS

[75] Inventor: Yun-Ho Choi, Incheon, Rep. of Korea

[73] Assignee: SamSung Electronics Co., Ltd., Suwon, Rep. of Korea

[21] Appl. No.: 09/012,487

[22] Filed: Jan. 23, 1998

[30]  Foreign Application Priority Data

Mar. 10, 1997 [KR] Rep. of Korea .......................... 97-7960

[51] Int. Cl.$^6$ ....................................................... G06F 9/06
[52] U.S. Cl. ............................. 713/2; 713/100; 710/104; 714/36; 714/49
[58] Field of Search .................................... 395/652, 682, 395/500, 182.04, 712, 700, 430; 711/164; 713/1, 2, 100; 710/104; 714/21, 36, 49

[56]  References Cited

U.S. PATENT DOCUMENTS

| | | | |
|---|---|---|---|
| 5,136,713 | 8/1992 | Bealkowski et al. | 395/700 |
| 5,388,267 | 2/1995 | Chan et al. | 395/700 |
| 5,473,775 | 12/1995 | Sakai et al. | 395/700 |
| 5,519,843 | 5/1996 | Moran et al. | 395/430 |
| 5,522,076 | 5/1996 | Dewa et al. | 395/700 |
| 5,535,357 | 7/1996 | Moran et al. | 395/430 |
| 5,537,540 | 7/1996 | Miller et al. | 714/38 |
| 5,579,522 | 11/1996 | Christeson et al. | 395/652 |
| 5,586,327 | 12/1996 | Bealkowski et al. | 713/2 |
| 5,604,904 | 2/1997 | Kini | 395/682 |
| 5,652,868 | 7/1997 | Williams | 395/500 |
| 5,701,492 | 12/1997 | Wadsworth et al. | 395/712 |
| 5,757,352 | 5/1998 | Miyamoto et al. | 345/101 |
| 5,793,943 | 7/1996 | Noll | 395/182.04 |
| 5,802,363 | 2/1997 | Williams et al. | 713/2 |
| 5,802,592 | 3/1996 | Chess et al. | 711/164 |
| 5,805,882 | 7/1996 | Cooper et al. | 395/652 |
| 5,836,013 | 8/1994 | Greene et al. | 713/2 |

*Primary Examiner*—Dennis M. Butler
*Assistant Examiner*—Rijue Mai
*Attorney, Agent, or Firm*—Robert E. Bushnell, Esq.

[57]  ABSTRACT

A method for updating a ROM BIOS includes the following steps: a step for reading an image data of a ROM BIOS which is to be updated; a step for reading a ROM BIOS image data from a ROM BIOS; a step for reading a new ROM BIOS image data from an auxiliary memory; a step for reading a new user information; a step for converting the new user information into an image data; a step for updating the new ROM BIOS image data and user information in the ROM BIOS. Since the user updates a ROM BIOS image data for oneself, the user information displayed during a POST operation can be displayed in the user's characteristic message. Therefore, the user can recognize one's computer through unique characteristics that are displayed on a monitor and easily identify one's computer among many different computers.

15 Claims, 6 Drawing Sheets

FIG. 8

| ROM BIOS image |
| :---: |
| User information sign on message |
| Company information sign on message |
| ROM BIOS image |

METHOD FOR UPDATING A ROM BIOS

This application makes reference to, incorporates the same herein, and claims all benefits accruing under 35 U.S.C §119 from an application entitled Method For Updating ROM BIOS earlier filed in the Korean Industrial Property Office on Mar. 10, 1997, and there duly assigned Ser. No. 97-7960 by that Office.

BACKGROUND OF THE INVENTION

1. Field of the Invention

The present invention relates to a method for updating a ROM BIOS (read only memory basic input/output system). More particularly, the present invention relates to the method which updates a ROM BIOS image data corresponding to user information and then displays the updated image data while performing a power-on-self-test (POST) after a power-on reset operation.

2. Description of the Related Art

A ROM BIOS, or BIOS-ROM, is programmed by predetermined regulations so that sign on messages are displayed during a POST procedure when booting a computer. The sign on message typically includes the computer producer, information about the manufacturer of the ROM BIOS and the current version of the ROM BIOS. The conventional art concerning the ROM BIOS update has been limited to improving the ROM BIOS by updating only the function of the ROM BIOS without changing a previously made particular image. In order to change or update the BIOS it is known to use a flash memory which comprises write protected memory blocks and memory blocks which can be erased and rewritten. The following patents, incorporated herein by reference, discribe the use of flash memories as ROM BIOS: U.S. Pat. No. 5,388,267 to Wai-Ming R. Chan, et al. entitled Method And Apparatus For Updating And Restoring System BIOS Functions While Maintaining BIOS Integrrity; U.S. Pat. No. 5,473,775 to Makoto Sakai entitled Personal Computer Using Flash Memory As BIOS-ROM; U.S. Pat. No. 5,519,843 to Dov Moran, et al. entitled Flash Memory System Providing Both BIOS And User Storage Capability; U.S. Pat. No. 5,522,076 to Koichi Dewa, et al. entitled Computer System Having BIOS (Basic Input/Output System)-ROM (Read Only Memory) Writing Function; and U.S. Pat. No. 5,535,357 to Dov Moran, et al. entitled Flash Memory System Providing Both BIOS And User Storage Capability.

Accordingly, for computers produced by the same company the conventional ROM BIOS update art has a disadvantage in that the sign on messages do not contain user information to be displayed during the POST procedure.

SUMMARY OF THE INVENTION

It is an object of the present invention to provide ROM BIOS having user informations stored therein and a method for updating ROM BIOS image data by first converting data regarding new user information input by a user into image data and then merging the image data of new user information with an old ROM BIOS image data, in order to substantially overcome the limitations and disadvantages of the prior art.

It is another object of the present invention to enable the user to recognize his computer through unique characteristics that are displayed on a monitor and make it easy to identify his/her computer by displaying the user information data while performing a power on self test (POST).

Additional objects and advantages of the invention will be set forth in part in the description which follows, and in part will be obvious from the description, or may be learned by practice of the invention.

To achieve the objects and in accordance with the purpose of the invention, as embodied and broadly described herein, the invention comprises the steps of reading a ROM BIOS image data from a ROM BIOS, reading a new ROM BIOS image data from an auxiliary memory, reading new user information, converting the new user information into image data; updating the ROM BIOS to store the image data corresponding to the new user information in the ROM BIOS.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein:

FIG. 8 illustrates the memory map of the ROM BIOS before the image data is updated in accordance with the second embodiment of the present invention.

DETAILED DESCRIPTION OF THE PREFERRED EMBODIMENT

The following detailed description of the invention refers to the accompanying drawings that illustrate preferred embodiments consistent with the principles of this invention. Other embodiments are possible and changes may be made to the embodiments without departing from the spirit and scope of the invention. The following detailed description does not limit the invention. Instead, the scope of the invention is defined only by the appended claims.

Figure 7:
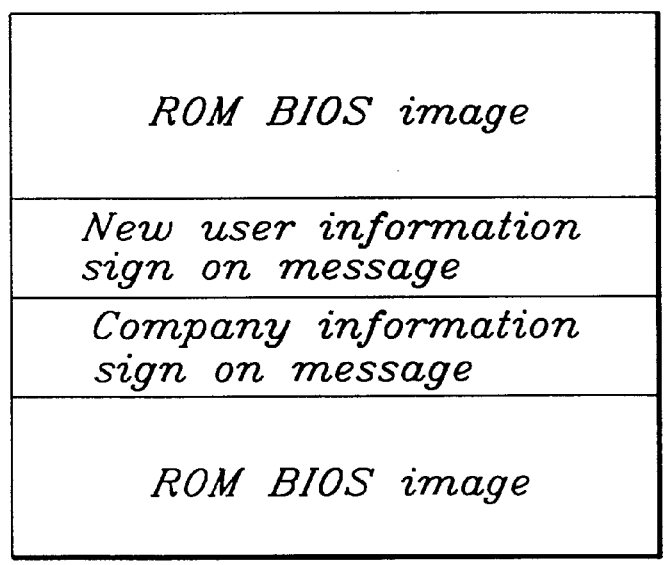
FIG. 7 illustrates the memory map of the ROM BIOS after the image data which is divided into the user information and the company information is updated in accordance with a second embodiment of the present invention.

First, the user information is defined to be any information the user desires to be displayed which can be readily identified to inform the user that the computer is his/her computer. This user information can be a sequence of characters, numbers or both which are displayed as any of a code, a social security number, a user's name, date of one's birth, sex, etc., when the computer is booted at power-on reset. And in a second embodiment, as shown in FIGS. 7 and 8, company information can also be stored in the ROM BIOS for display in a manner similar to that for the user information. Accordingly, in the method described below it should be understood that all reference to user information may also correspond to inclusion of company information.

Figure 1A:
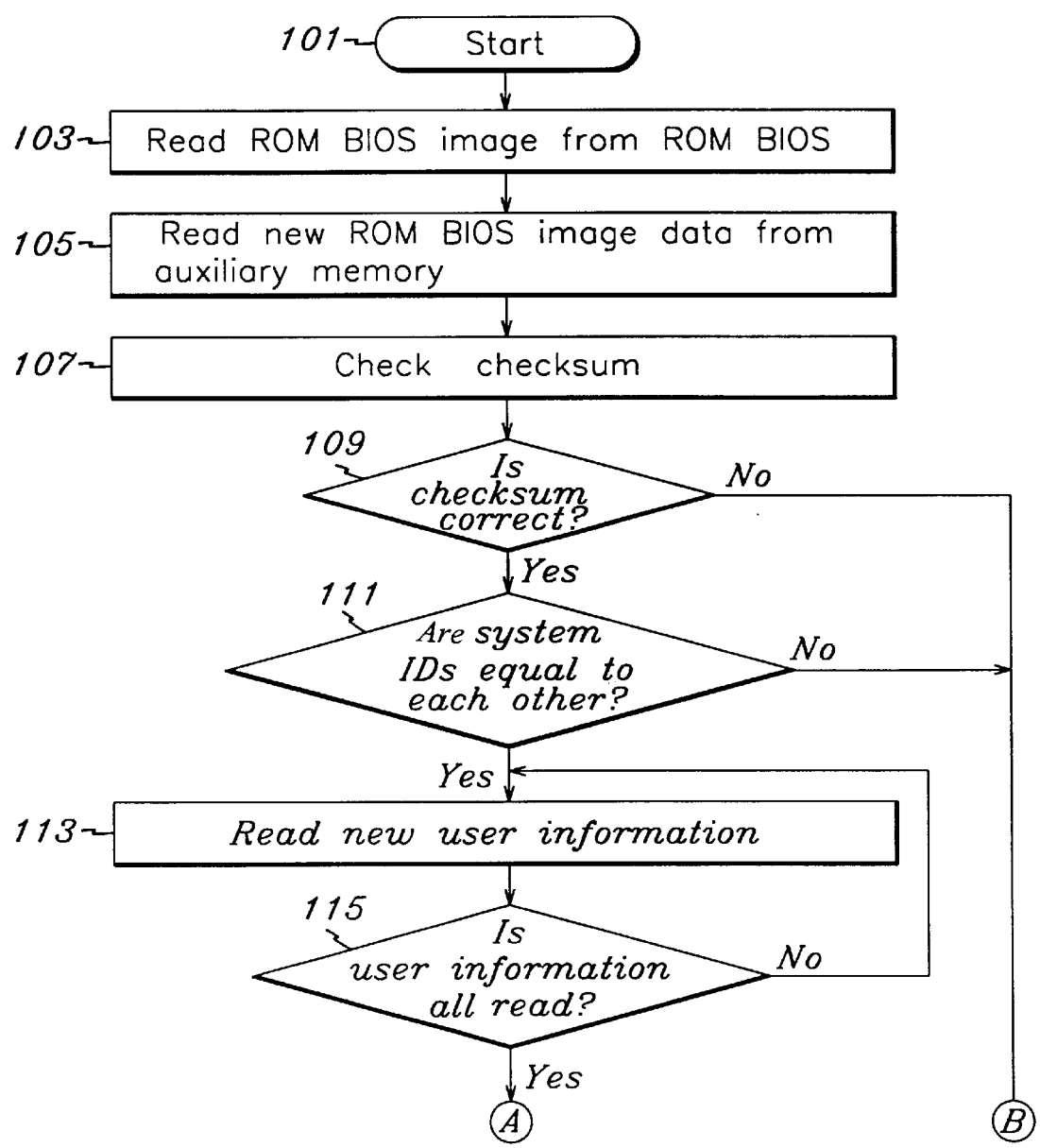
FIGS. 1A and 1B are a flowchart which illustrates a method for updating a ROM BIOS in accordance with the principles of the present invention.
Figure 1B:
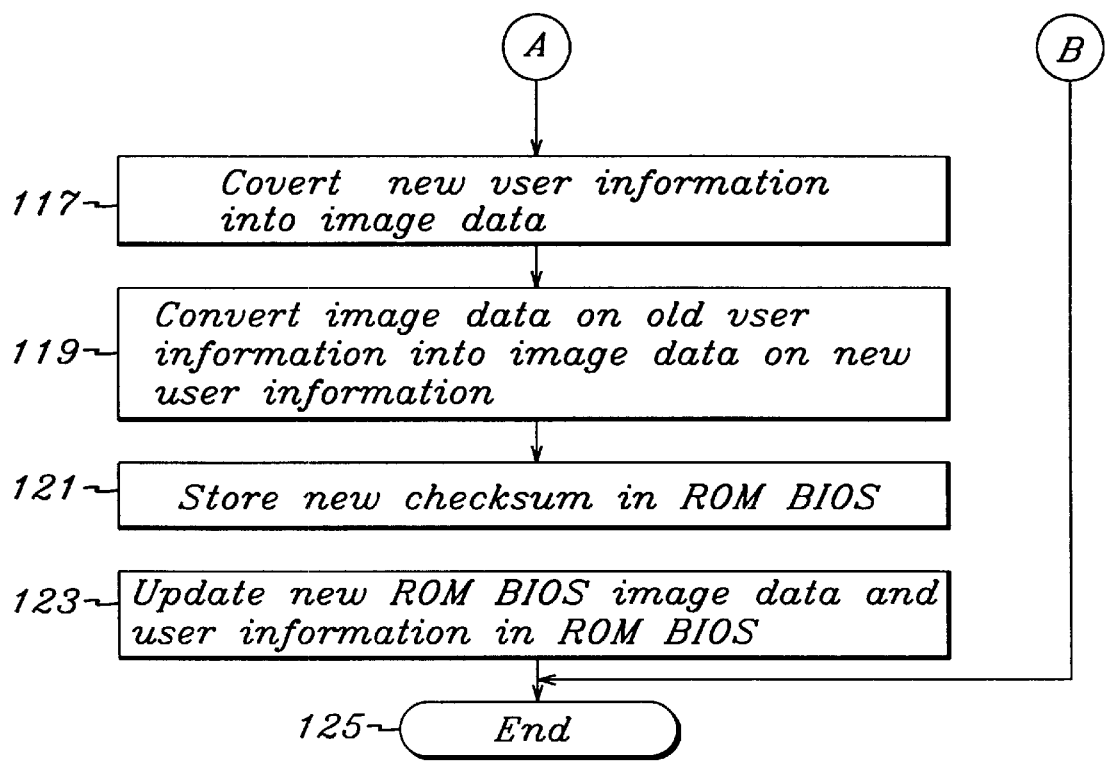
Figure 2:
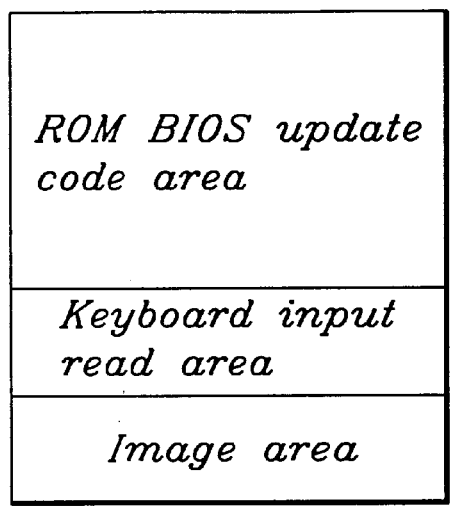
FIG. 2 shows a memory map of a system memory used by the method for updating the ROM BIOS in accordance with the principles of the present invention.
Figure 4:
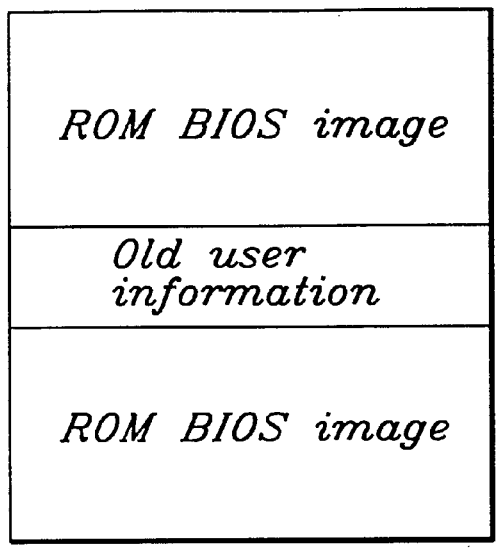
FIG. 4 is a memory map showing the state of the ROM BIOS image data before the update of the image data in accordance with the principles of the present invention.

Referring to FIGS. 1A and 1B, the operation for updating the user information begins with reading ROM BIOS image data from a ROM BIOS which is to be updated, and checking the system ID of the read ROM BIOS image data. The read ROM BIOS image data is stored in a system memory in the state of the memory map such as shown in FIG. 4, steps 101 to 103.

Next, new ROM BIOS image data is read from an auxiliary memory such as a floppy disk or a hard disk is loaded into the system memory, step 105, and then the checksum is read in step 107. Then, in order to determine whether there were any errors in the reading the new ROM BIOS image data, a check is made to determine whether the checksum is correct, step 109.

If the checksum is determined to be correct, the system ID of the new ROM BIOS image data is checked to determine whether the system ID of the new ROM BIOS image data is the same as that of the ROM BIOS image data to be updated, step 111. If the checksum is incorrect or the system ID of the new ROM BIOS image data is not equal to the system ID of the ROM BIOS image data to be updated, the process jumps to step 125 and ends.

Figure 3:
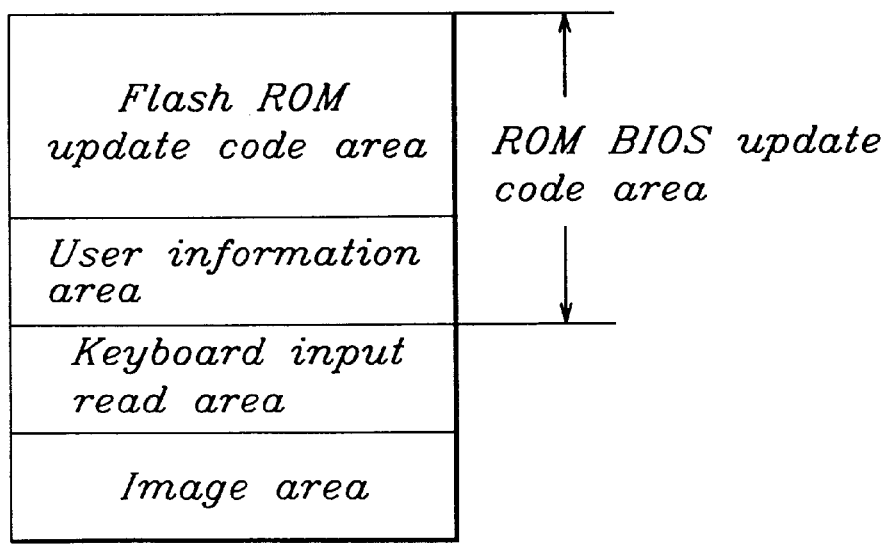
FIG. 3 shows a more detailed memory map of the ROM BIOS update code area of the system memory shown in FIG. 2.
Figure 5:
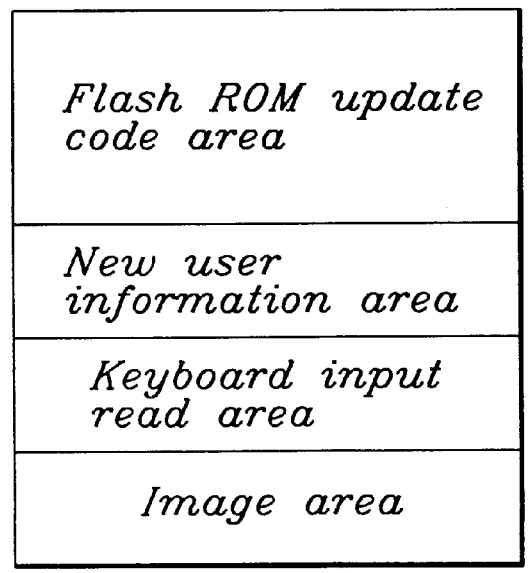
FIG. 5 is a memory map showing that new user information is input into the user information area of the ROM BIOS update code area shown in FIG. 3 of the system memory.

If both of the system IDs are determined to be equal to each other, new user information input via a keyboard is read by a keyboard input read area of the system memory in step 113. Next, whether all the new user information is read or not is determined in step 115. If any new user information to be read yet remains, the remaining user information is then read by returning to step 113. When step 115 determines that the reading of new user information is finished, the read new user information is stored in a user information area of a temporary memory after being converted into image data by the flash ROM update code area, step 117, of the system memory. As a result, the user information area of the ROM BIOS update code area such as shown in FIG. 3 is converted to the new user information area such as shown in FIG. 5.

Figure 6:
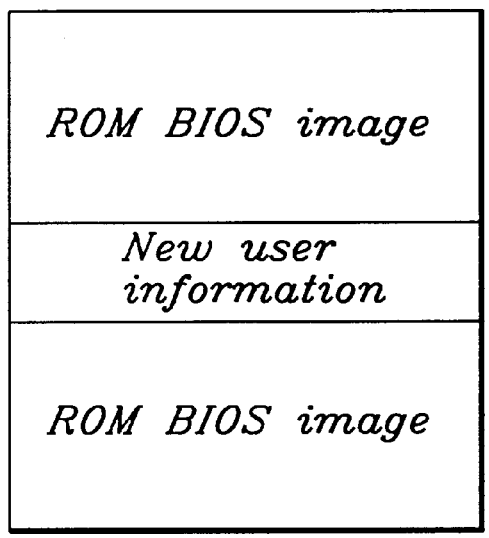
FIG. 6 is a memory map showing the updated ROM BIOS in which the new user information is stored in accordance with the principles of the present invention.

Then, the to-be-updated ROM BIOS image data corresponding to the old user information stored in the system memory in the state of the memory map such as shown in FIG. 4 is overwritten by the image data corresponding to the the new user information stored in the user information area. Therefore, the memory map of the ROM BIOS image data which is to be updated is changed from the state such as shown in FIG. 4 to the state such as shown in FIG. 6 since the old user information is overwritten by the image data corresponding to the new user information, step 119.

Then the checksum of the new ROM BIOS image data is updated in the ROM BIOS checksum area, step 121, and then the user information of the ROM BIOS is updated to the new image data and the new user information by utilizing the image data corresponding to the new user information stored in the system memory. As a result, the state of the memory map of the ROM BIOS before the update of the image data such as shown in FIG. 8 is converted into the state of the memory map of the ROM BIOS which is updated to the new user information sign on message and the company information sign on message such as shown in FIG. 7, step 125.

Therefore, the user information message which is of the sign on messages displayed during a POST operation displays the new user information newly inputted by the user. Consequently, the advantage of the present invention lies in that user information displayed during a POST operation will display information input by the user which can be readily identified to distinguish one's computer among many different computers for many reasons such as work station identification, security, theft recovery, etc.

What is claimed is:

1. A method for updating a ROM BIOS comprising the steps of:
    reading ROM BIOS image data from a ROM BIOS;
    reading new ROM BIOS image data from an auxiliary memory;
    reading new user information;
    converting said new user information into corresponding image data;
    updating said new ROM BIOS image data and said image data corresponding to said new user information in said ROM BIOS.

2. The method as set forth in claim 1, further comprising the steps of determining, prior to said step of reading new user information, whether a checksum of said new ROM BIOS image data is correct to check whether there were any errors in the reading, of said new ROM BIOS image data and ending said updating method when it is determined that said checksum is incorrect.

3. The method as set forth in claim 1, further comprising the steps of determining, prior to said step of reading new user information, whether a system ID of said ROM BIOS image data read from said ROM BIOS is equal to a system ID of said new ROM BIOS image data read from said auxiliary memory and ending said updating method when it is determined that said system IDs are not equal.

4. The method as set forth in claim 2, further comprising the steps of determining whether a system ID of said ROM BIOS image data read from said ROM BIOS is equal to a system ID of said new ROM BIOS image data read from said auxiliary memory, when it is determined that said checksum is correct, ending said updating method when it is determined that said system IDs are not equal, and, performing said step of reading new user information when it is determined that said system IDs are equal.

5. The method as set forth in claim 1, wherein said step of reading new user information comprises reading data input via a keyboard into a keyboard input read area of a system memory.

6. The method as set forth in claim 1, wherein said step of reading new user information further comprises a step of determining whether all of said new user information has been read and repeating said step of reading new user information until it is determined that all of said new user information has been read.

7. The method as set forth in claim 5, wherein said step of converting said new user information into corresponding image data is performed by utilizing a flash ROM update code stored in a flash ROM update code area of said system memory.

8. The method as set forth in claim 1, wherein said step of updating said new ROM BIOS image data and said image data corresponding to said new user information in said ROM BIOS comprises the steps of:
    overwriting old user information stored in a system memory by said image data corresponding to the new user information;
    storing said checksum in said ROM BIOS; and
    updating a user information of said ROM BIOS to the new image data corresponding to the new user information by utilizing the image data corresponding to the new user information stored in said system memory.

9. The method as set forth in claim 7, wherein said step of updating said new ROM BIOS image data and said image data corresponding to said new user information in said ROM BIOS comprises the steps of:

overwriting old user information stored in said system memory by said image data corresponding to the new user information;

storing said checksum in said ROM BIOS; and updating a user information of said ROM BIOS to the new image data corresponding to the so new user information by utilizing the image data corresponding to the new user information stored in said system memory.

10. A method for updating a ROM BIOS comprising the steps of:

reading ROM BIOS image data from a ROM BIOS image area of a ROM BIOS which is to be updated, and checking a system ID of the read ROM BIOS image data;

storing the read ROM BIOS image data in a system memory;

reading new ROM BIOS image data from an auxiliary memory and loading said new ROM BIOS image data into the system memory;

utilizing a keyboard input read area of the system memory for reading new user information input by a user via a keyboard;

converting said new user information into corresponding image data by utilizing a flash ROM update code stored in a flash ROM update code area of said system memory;

storing said image data corresponding to said new user information into a temporary memory;

reading said new ROM BIOS image data from said system memory for updating said ROM BIOS image area of said ROM BIOS; and reading said image data corresponding to said new user information from said temporary memory for updating a user information area of said ROM BIOS.

11. The method as set forth in claim 10, further comprising the steps of determining, prior an to said reading of new user information, whether a checksum of said new ROM BIOS image data is correct to check whether there were any errors in the reading of said new ROM BIOS image data and ending said updating method when it is determined that said checksum is incorrect.

12. The method as set forth in claim 10, further comprising the steps of determining, prior to said reading of new user information, whether said system ID of said ROM BIOS image data read from said ROM BIOS is equal to a system ID of said new ROM BIOS image data read from said auxiliary memory, and ending said updating method when it is determined that said system IDs are not equal.

13. The method as set forth in claim 11, further comprising the steps of determining whether said system ID of said ROM BIOS image data read from said ROM BIOS is equal to a system ID of said new ROM BIOS image data read from said auxiliary memory, when it is determined that said checksum is correct, ending said updating method when it is determined that said system IDs are not equal, and performing said reading of new user information when it is determined that said system IDs are equal.

14. The method as set forth in claim 10, wherein said step of reading new user information further comprises a step of determining whether all of said new user information has been read and repeating said step of reading new user information until it is determined that all of said new user information has been read.

15. The method as set forth in claim 10, further comprising a step of storing said checksum of said new ROM BIOS image data into said ROM BIOS.

* * * * *